J. P. SMOTHERS.
MACHINE FOR STEMMING AND CUTTING TOBACCO.

No. 180,951. Patented Aug. 8, 1876.

Attest:
Donn I. Twitchell
Will W. Dodge

Inventor:
J. P. Smothers
by Dodge & Son
Attys.

2 Sheets—Sheet 2.
J. P. SMOTHERS.
MACHINE FOR STEMMING AND CUTTING TOBACCO.
No. 180,951. Patented Aug. 8, 1876.
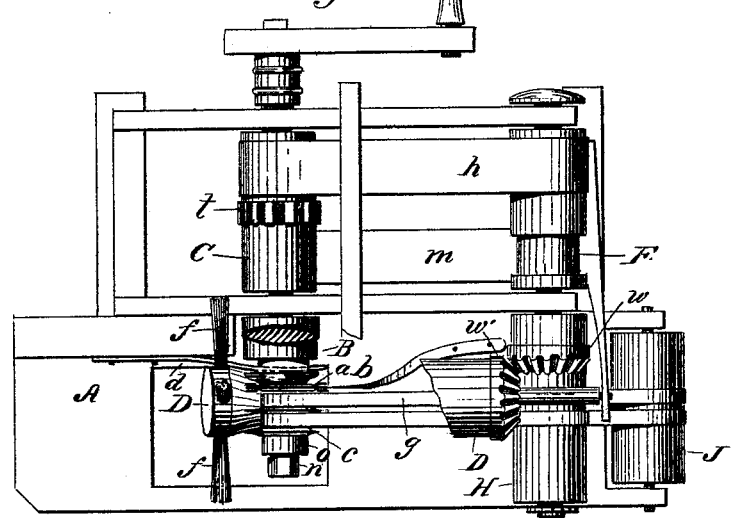
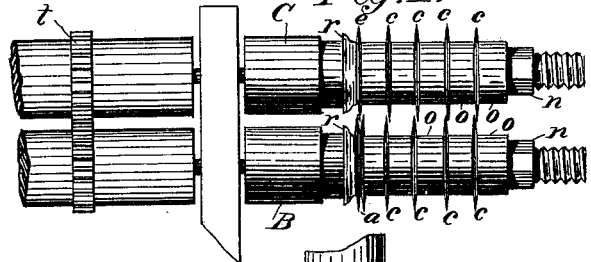
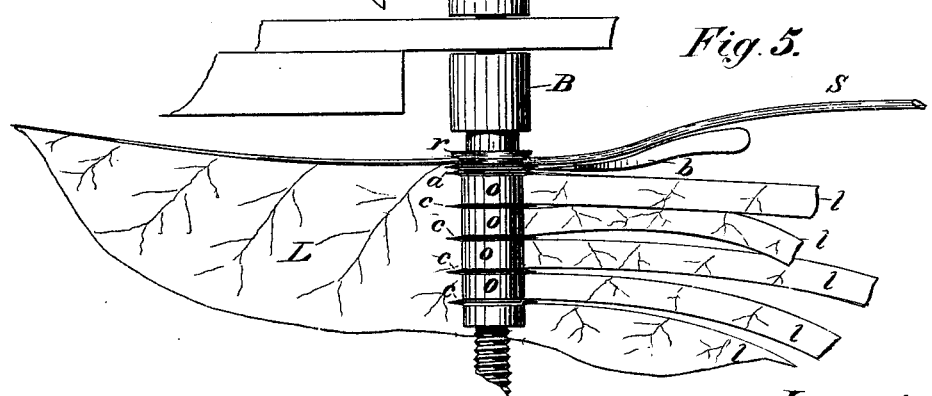
Attest:
Donn J. Twitchell.
Will H. Dodge.
Inventor:
J. P. Smothers,
by Dodge & Son
Attys.

UNITED STATES PATENT OFFICE.

JAMES P. SMOTHERS, OF WENTWORTH, NORTH CAROLINA, ASSIGNOR OF TWO-THIRDS HIS RIGHT TO TURNER W. PATTERSON, DAVID SETTLE, AND THOMAS SETTLE, OF NORTH CAROLINA.

IMPROVEMENT IN MACHINES FOR STEMMING AND CUTTING TOBACCO.

Specification forming part of Letters Patent No. 180,951, dated August 8, 1876; application filed April 29, 1876.

*To all whom it may concern:*

Be it known that I, JAMES PINKEY SMOTHERS, of Wentworth, in the county of Rockingham and State of North Carolina, have invented certain Improvements in Machine for Stemming and Slitting Tobacco, of which the following is a specification:

My invention consists of a machine so constructed as to cut the stems from tobacco-leaves, and, if desired, at the same time to cut the leaves into strips for cigar-wrappers, all as hereinafter more fully set forth.

Figure 1:
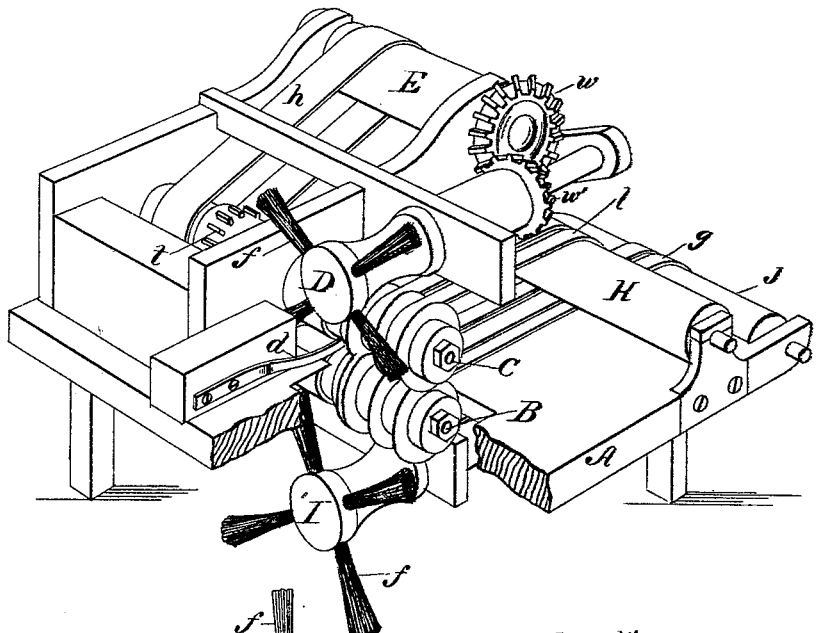
Figure 2:
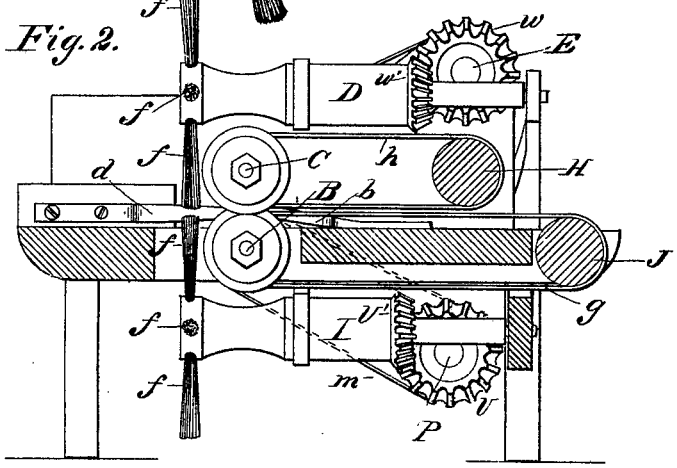

Figure 1 is a perspective view of the machine complete, with one corner of the table broken away, in order the better to show the parts. Fig. 2 is a side elevation, shown partly in section. Fig. 3 is a top-plan view, with a portion in section; and Figs. 4 and 5 are portions shown detached.

In the preparation of tobacco for use in cigars, &c., it is necessary to remove the stems from the leaves, which operation is usually performed by hand, and is denominated stemming. When performed by hand, this is a slow and tedious operation, and moreover it is is more or less wasteful, inasmuch as in removing the stems it is impossible to prevent some waste of that portion of the leaf which might otherwise be utilized. The object of my present invention is to provide a machine for doing this work, in a more rapid and economical manner.

To construct a machine on my plan, I provide a suitable frame, on which is a table or platform, A, and in which, near its front, I mount two horizontal shafts, B and C, one being placed directly over the other, and being provided with gear-wheels $t$ or equivalent means to make them rotate together, as shown in Figs. 1, 2, 3, and 4. On the shaft B, as shown in Figs. 3, 4, and 5, I mount two circular disks or knives, $a$, with a small space between them, and on the shaft C, directly over these, I secure another disk or knife, $e$, the edge of the latter being arranged to fit in the space between the two first, as shown in Fig. 4. Upon both shafts B and C, near the inner side of these knives, I arrange a concave collar, $r$, thus forming a groove close alongside of the knives for the stem of the leaf to lay in as it is fed along. In front of these rolls or shafts B C I secure a spring, $d$, as shown in Figs. 1, 2, and 3, with its loose end resting between the rolls close up against the collars $r$, which is intended to keep the stem pressed close up to the knives $a$ $e$, so that as they rotate they shall sever the leaf close alongside of the stem. It is obvious that the flanges $r$ on the rolls may be dispensed with, in which case the spring $d$ will press directly against the side of the stem, and thus keep it crowded close up alongside of the stemming-knives $a$ $e$, the spring being provided with a thumb-screw or any similar means for adjusting its pressure on the stem, as may be found necessary, the sole object of the spring being to keep the stem close up to the knives or cutters. In rear of the rolls I secure a curved metal piece, $b$, as shown in Figs. 3 and 5, the front end of said piece being made to fit in the narrow space between the knives $a$, and thus act as a scraper to keep them clear from adhering matter, which might tend to interfere with their operation. This curved piece also serves as a guide to shave the severed stem off at one side, and thus separate it from the leaf, as it is cut, as shown in Fig. 5, where S represents the stem and L the leaf in the act of passing between the rolls.

At the rear end of the frame I mount two other shafts parallel with the rolls B C, one of these shafts, E, being placed above, and the other one, P, being below, the table, the shaft E being driven by a belt, $p$, from the upper rolls C, while the lower shaft P is in like manner driven by a belt, $m$, from the lower roll B, as shown in Figs. 2 and 3. Each of these shafts E and P are provided with bevel-gear $w$ and $v$ at their inner ends, which engage with similar gear $w'$ and $v'$ on the rear ends of two shafts, D and I, which are arranged at right angles to the rolls B C, as shown in Figs. 1 and 2. These shafts D and I are arranged one above and the other below the rolls, as shown in Fig. 2, and each of them is provided at their front ends with a series of radial brushes, $f$, which rotate in close proximity directly in front of the knives on the rolls B C, they being arranged thus to operate on the upper and lower faces of the leaf as it is fed along, for the purpose of brushing off any adhering dirt, particles of sand, &c., and also to keep the leaf spread out flat and smooth.

At the rear end of the frame I mount two smooth rolls, H and J, as shown in Figs. 1, 2, and 3, around which from the rolls B C pass endless belts $g$ and $h$ for the purpose of feeding or conveying along the leaf as it passes from the knives, and after the stem has been severed therefrom. It is sometimes desirable to also cut the leaf into strips for the purpose of making cigar-wrappers, and to enable this to be done at the same time that the stems are removed, I have shown the rolls B C provided with a series of additional knives, $c$, as shown in Fig. 4, so that as the leaf is fed along between the rolls it will be cut into a series of strips, $l$, as shown in Fig. 5. These knives $c$ are slipped onto the shafts of the rolls, and a washer, $o$, placed between them, as shown. Any number of knives may be thus arranged, and, by using washers of different lengths, the knives may be so spaced as to cut the strips $l$ of any desired width, the knives and washers being secured on the shafts by a nut, $n$, which is screwed thereon, as shown in Fig. 4. It will of course be understood that this slitting arrangement is not a necessary part of a stemming-machine, but is an addition thereto, and that when it is desired to simply stem the tobacco these additional knives $c$ will be left off or omitted. So, too, the brushes may be omitted, and the leaves stemmed without them; but I prefer to use them, for the reasons previously stated. In case they are omitted, then the shafts E and P, with their belts $p$ and $m$, may also be omitted, and I propose to build the machine in some instances with these parts omitted.

While I have shown the machine as provided with a crank for operating it by handpower, it will be understood that it may be operated by steam or animal power, and when used on a large scale will of course be so driven.

A machine constructed to operate on the plan here described will perform the labor of several hands and at the same time save considerable waste of tobacco.

Having thus described my invention, what I claim is—

1. The rolls B C, provided with the flanges $r$ and the circular cutters $a$ and $e$, all constructed and arranged to operate substantially as described.

2. In combination with the circular cutters $a$ and $e$, the spring $d$, arranged to operate substantially as and for the purpose set forth.

3. In combination with the cutters $a$ and $e$, the combined scraper and guide $b$, constructed and arranged to operate substantially as shown and described.

4. The combination, in a tobacco-machine, of the rolls B C, provided with one or more pairs of cutters, and the rotating brushes $f$, all constructed and arranged to operate substantially as and for the purpose set forth.

5. In combination with the rolls B C, provided with the stemming-cutters $a$ $e$, the slitting-cutters $c$, arranged to operate in connection therewith, whereby the stem may be removed and the leaf cut into strips simultaneously, as set forth.

JAMES PINKEY SMOTHERS.

Witnesses:
DAVID S. REID,
JAMES A. PATTERSON.